United States Patent
Goto et al.

(10) Patent No.: US 9,170,945 B2
(45) Date of Patent: Oct. 27, 2015

(54) COMMUNICATION MANAGEMENT APPARATUS, COMMUNICATION MANAGEMENT METHOD, AND COMPUTER PROGRAM PRODUCT

(75) Inventors: Masataka Goto, Kanagawa (JP); Nobuhiko Sugasawa, Tokyo (JP); Yuta Kobayashi, Kanagawa (JP); Shinya Murai, Kanagawa (JP); Kosuke Takahashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 145 days.

(21) Appl. No.: 13/611,876

(22) Filed: Sep. 12, 2012

(65) Prior Publication Data

US 2013/0232314 A1 Sep. 5, 2013

(30) Foreign Application Priority Data

Mar. 1, 2012 (JP) .................................. 2012-045862

(51) Int. Cl.
G06F 12/00 (2006.01)
G06F 12/08 (2006.01)
G06F 12/06 (2006.01)
G06F 12/14 (2006.01)

(52) U.S. Cl.
CPC ........ G06F 12/0815 (2013.01); G06F 12/0866 (2013.01); G06F 12/0646 (2013.01); G06F 12/14 (2013.01); G06F 2212/2146 (2013.01)

(58) Field of Classification Search
CPC ... G06F 21/121; G06F 12/14; G06F 12/0646; G06F 12/0866
See application file for complete search history.

(56) References Cited

U.S. PATENT DOCUMENTS

2008/0005514 A1* 1/2008 Kurokawa et al. ............ 711/163
2010/0023532 A1* 1/2010 Yoshimura ...................... 707/10
2010/0288839 A1* 11/2010 Adams et al. ................. 235/441

FOREIGN PATENT DOCUMENTS

JP 02129741 A 5/1990
JP 2006-216011 A 8/2006

OTHER PUBLICATIONS

Japanese Office Action dated Apr. 30, 2014 in counterpart Japanese Application No. 2012-045862.

* cited by examiner

*Primary Examiner* — Cheng-Yuan Tseng
*Assistant Examiner* — Arvind Talukdar
(74) *Attorney, Agent, or Firm* — Holtz, Holtz, Goodman & Chick PC

(57) ABSTRACT

According to an embodiment, a communication management apparatus mediates data between an information processing terminal having a temporary memory and an external memory device that is installed outside the information processing terminal. The apparatus includes a receiving unit configured to receive a write request issued by a device other than the information processing terminal for writing the data in the external memory device; a reading-writing unit configured to control reading of the data from the external memory device and control writing of the data in the external memory device; and a delete command issuing unit configured to, when the write request with respect to the external memory device is received, issue a delete command to the information processing terminal for deleting temporary data that is stored in the temporary memory.

5 Claims, 3 Drawing Sheets

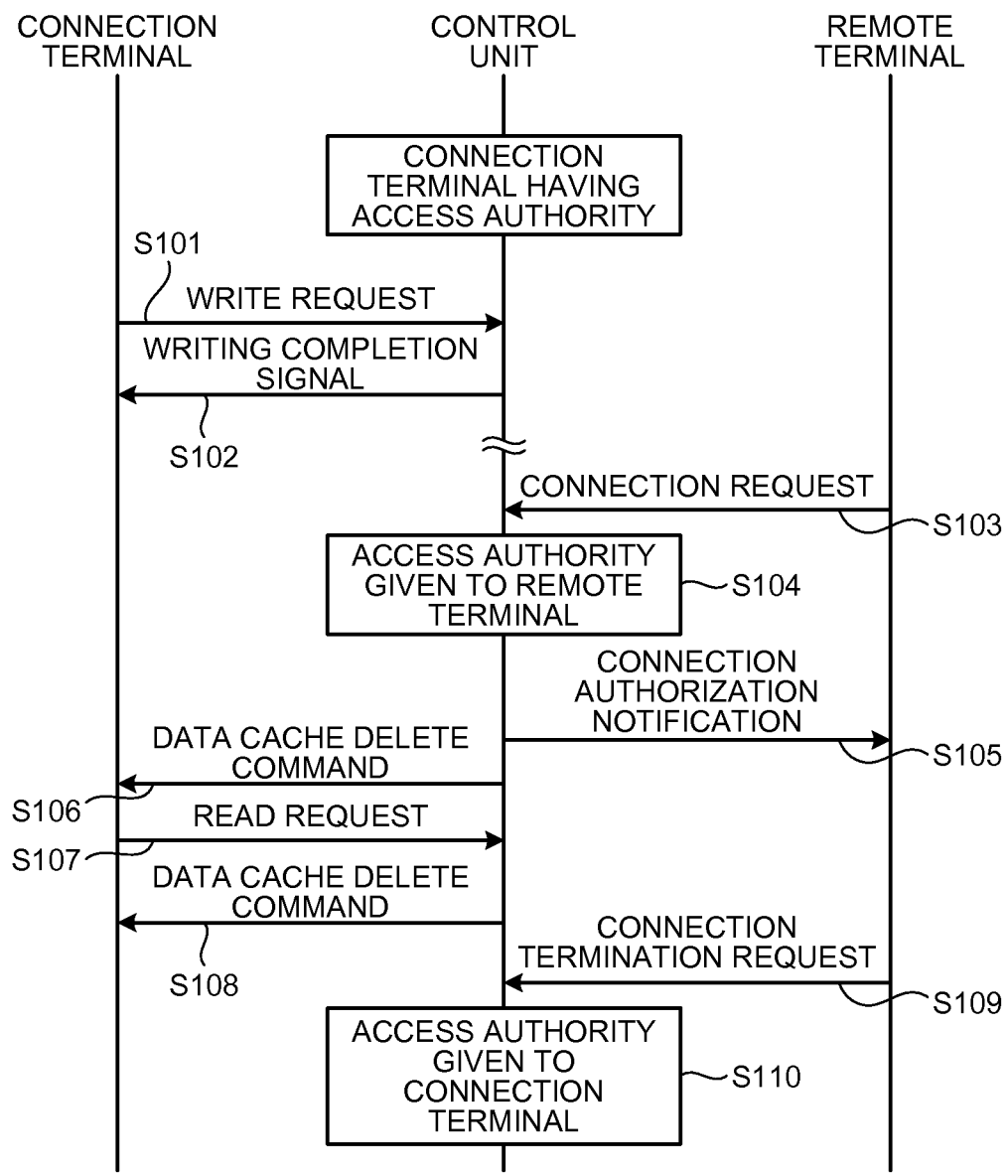

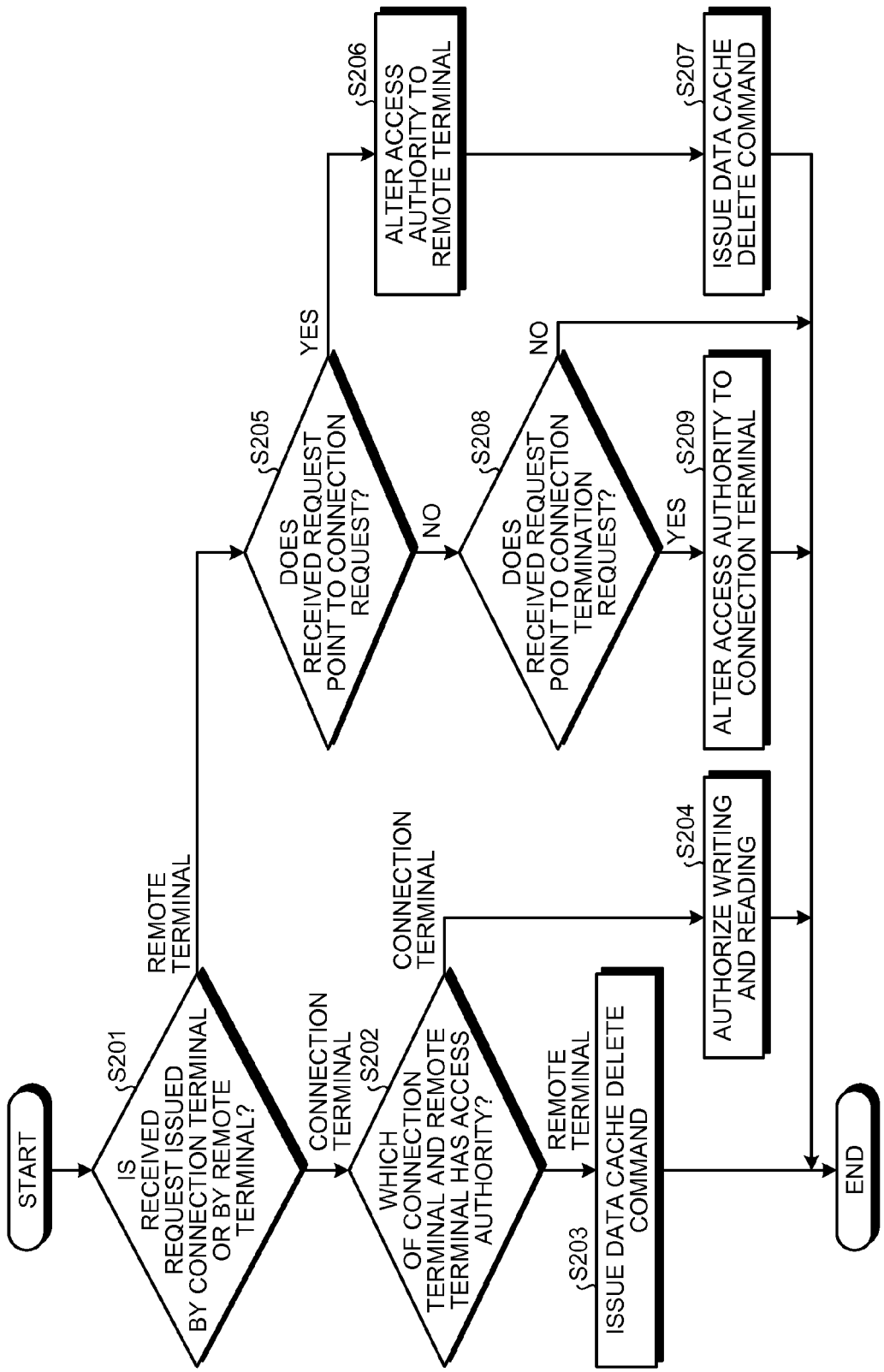

US 9,170,945 B2

COMMUNICATION MANAGEMENT APPARATUS, COMMUNICATION MANAGEMENT METHOD, AND COMPUTER PROGRAM PRODUCT

CROSS-REFERENCE TO RELATED APPLICATION(S)

This application is based upon and claims the benefit of priority from Japanese Patent Application No. 2012-045862, filed on Mar. 1, 2012; the entire contents of which are incorporated herein by reference.

FIELD

Embodiments described herein relate generally to a communication management apparatus, a communication management method, and a computer program product.

BACKGROUND

It is known that some memory cards have an USB interface (USB stands for universal serial bus) or an SD interface (SD stands for secure digital) as well as have a wireless communication interface such as TransferJet or IEEE802.11. Among devices that use memory cards, there are devices which communicate via the USB interface or the SD interface and there are devices which communicate via the wireless communication interface such as TransferJet or IEEE802.11. Each such device can access a storage device (i.e., a device for storing data) installed in the memory card, and can perform reading and writing operations with respect to the data stored in the storage device.

However, if an attempt to write data is performed from a remote location via the wireless communication interface, then there occurs inconsistency between a data cache, which is maintained with respect to the data stored in the memory card and which is maintained in a terminal to which the memory card is connected, and the updated data in the storage device that gets updated due to the writing operation. Consequently, there are times when a mismatch in the contents of the stored data remains unresolved or when a mismatch in the file management information leads to malfunctioning of the file system.

BRIEF DESCRIPTION OF THE DRAWINGS

FIG. 2 is a sequence diagram illustrating a sequence of operations performed when a write request is issued in the communication management apparatus according to the embodiment; and FIG. 3 is a flowchart for explaining an exemplary sequence of operations performed when a write request is issued in the communication management apparatus according to the embodiment.

DETAILED DESCRIPTION

Figure 1:
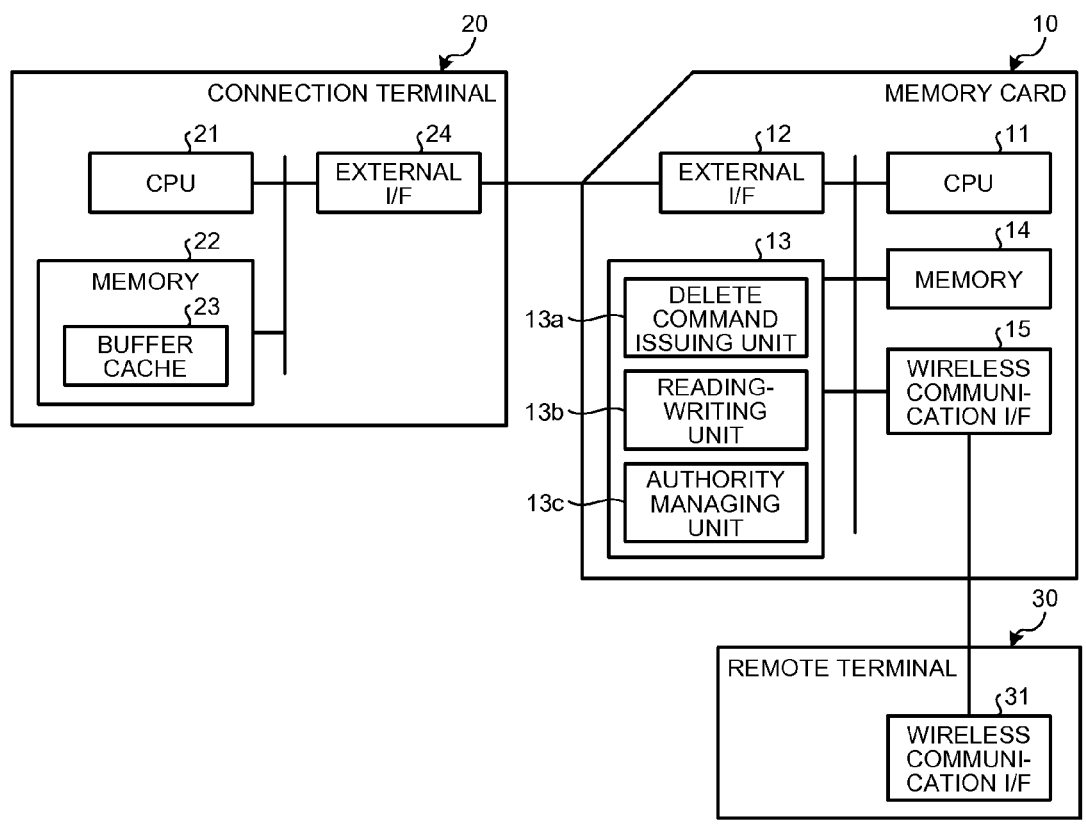
FIG. 1 is a functional block diagram of a communication management apparatus according to an embodiment.

According to an embodiment, a communication management apparatus mediates data between an information processing terminal having a temporary memory and an external memory device that is installed outside the information processing terminal. The apparatus includes a receiving unit configured to receive a write request issued by a device other than the information processing terminal for writing the data in the external memory device; a reading-writing unit configured to control reading of the data from the external memory device and control writing of the data in the external memory device; and a delete command issuing unit configured to, when the write request with respect to the external memory device is received, issue a delete command to the information processing terminal for deleting temporary data that corresponds to the data stored in the external memory device and that is stored in the temporary memory.

An exemplary embodiment of a communication management apparatus according to the invention is will be described below in detail with reference to the accompanying drawings. However, the invention is not limited by this embodiment.

FIG. 1 is a functional block diagram of a communication management apparatus according to the embodiment. In the communication management apparatus according to the embodiment; a memory card has, for example, a flash memory serving as a memory area and is provided with a communication function and various control functions.

As illustrated in FIG. 1, a memory card 10 is inserted in and connected to a connection terminal 20 (information processing terminal) according to the USB standard or the SD memory card standard (SD stands for secure digital). The connection terminal 20 is, for example, a tablet or a personal computer (PC). The memory card 10 includes a central processing unit (CPU) 11, an external interface 12, a control unit 13, a memory 14 (such as a flash memory) serving as a memory device, and a wireless communication interface 15. In the embodiment, although the memory 14, which is an external memory device, is installed inside the memory card 10; it is also possible to install an external memory device on the outside of the memory card 10.

The external interface 12 receives and transmits data and control signals from and to the connection terminal 20, which is an information processing terminal connected to the memory card 10. The control unit 13 controls various operations performed by the memory card 10. The control unit 13 can either be implemented with a computer program written in advance in a memory area such as a hard disk drive (HDD) or a memory, or be implemented with a circuit. Moreover, the control unit 13 includes a delete command issuing unit 13a, a reading-writing unit 13b, and an authority managing unit 13c.

The reading-writing unit 13b follows a reading signal or a writing signal received via the external interface 12 or via the wireless communication interface 15, and accordingly writes data in the memory 14 or reads data from the memory 14. The delete command issuing unit 13a issues an instruction to the connection terminal 20 to delete the data cache stored in a buffer cache 23 (temporary memory) (described later) that is maintained in the connection terminal 20. The details regarding the buffer cache 23 are given later. The authority managing unit 13c determines whether to authorize a connection request issued with respect to the memory 14 by the external interface 12 or to authorize a connection request issued with respect to the memory 14 by the wireless communication interface 15. Meanwhile, access authority information can either be stored in the memory 14 or be stored in a register as a flag.

The connection terminal 20 includes a CPU 21, a memory 22, the buffer cache 23, and an external interface 24. In the connection terminal 20, the operating system (OS) thereof is loaded in the CPU 21 and manages the input of data to the memory card 10 and the output of data from the memory card 10. In order to make the input-output operations more efficient, the OS holds data cache in the buffer cache 23 of the memory 22 in the connection terminal 20. The data cache points to a temporary memory in which data that is present in the memory card 10 is stored. The use of the data cache makes it possible to skip the repeatedly-performed reading operation with respect to the data, as well as makes it possible to perform most of the frequently-preformed rewriting operations in the memory 22 thereby enabling achieving reduction in the number of writing operations.

Meanwhile, via the wireless communication interface 15, the memory card 10 is also connected to a wireless communication interface 31 of a remote terminal 30, which can be PC or an HDD. In the embodiment, the explanation is given for an example in which the memory card 10 receives files from an HDD recorder or the like via the wireless communication interface 15, and stores those files in the internal memory 14. Herein, the connection between the memory card 10 and the remote terminal 30 can be established using a technology other than the wireless communication technology. For example, the connection can be established using cable communication, a wireless local area network (LAN), Ethernet (registered trademark), or TransferJet that is a close-proximity wireless transfer technology.

With reference to a sequence diagram illustrated in FIG. 2, explained below is a sequence of operations performed when a write request is issued with respect to the memory card 10. As illustrated in FIG. 2, usually, in the initial state, the access authority is with the connection terminal 20 to which the memory card 10 is connected. In that state, if the connection terminal 20 issues a write request to the external interface 12 of the memory card 10 (Step S101), then the reading-writing unit 13b of the control unit 13 sends a writing completion signal to the connection terminal 20 via the external interface 12 (Step S102). Herein, a write request issued by the connection terminal 20 contains the address of the destination for writing and contains the data of the writing contents.

In a case when the remote terminal 30 writes files in the memory 14 via the wireless communication interface 15, a sequence of operations is performed to establish a communication connection. When the remote terminal 30 issues a connection request for the purpose of data writing (Step S103), the authority managing unit 13c of the control unit 13 alters the access authority to the remote terminal 30 (Step S104). Then, the reading-writing unit 13b of the control unit 13 authorizes writing and sends a connection authorization notification to the remote terminal 30 (Step S105).

Subsequently, via the external interface 12, the delete command issuing unit 13a of the control unit 13 sends a delete signal to the connection terminal 20 as an instruction to delete the data cache stored in the buffer cache 23 (Step S106). As an example of the delete signal, it is possible to use a signal indicating that the memory card 10 is released from the inserted state. Alternatively, it is also possible to use a message notifying that the memory card 10 has been replaced. Still alternatively, instead of issuing a message, in an interface standard in which insertion and removal can be electrically expressed, the connection of the memory card 10 can be electrically terminated so that the memory card 10 is detected to have been removed from the connection terminal 20.

In the state in which the access authority information indicates that the remote terminal 30 has been given the access authority, if the connection terminal 20 issues a read request for the purpose of reading data from the memory 14 (Step S107); then, as a response to the read request, the delete command issuing unit 13a of the control unit 13 sends a delete signal to the connection terminal 20 via the external interface 12 as an instruction to delete the data cache stored in the buffer cache 23 (Step S108). In the embodiment, a delete signal is sent not only when the remote terminal 30 issues a connection request for the purpose of data writing but also when the connection terminal 20 issues a reading request of the purpose of data reading while the remote terminal 30 has the access authority. However, alternatively, a delete signal can be sent in only one of those two cases. Meanwhile, as the target data cache for deletion, it is possible to consider the entire data cache present in the buffer cache 23 or to consider the data cache corresponding only to the data stored in the memory 14.

Once the remote terminal 30 finishes writing data in the memory 14, it issues a connection termination request to the control unit 13 (Step S109). Upon receiving the connection termination request, the authority managing unit 13c of the control unit 13 alters the access authority to the connection terminal 20 (Step S110).

Explained below with reference to FIG. 3 is an exemplary sequence of operations performed in the memory card 10 according to the embodiment. The operations illustrated in FIG. 3 are started when a request signal is received by the control unit 13 via the external interface 12 or via the wireless communication interface 15. Firstly, the control unit 13 determines whether or not the received request signal was sent by the connection terminal 20 or by the remote terminal 30 (Step S201).

If it is determined that the received request signal was sent by the connection terminal 20, then the control unit 13 determines whether the connection terminal 20 has the access authority or the remote terminal 30 has the access authority (Step S202). If it is determined that the remote terminal 30 has the access authority, then the delete command issuing unit 13a sends a delete command signal to the connection terminal 20 as an instruction to delete the data cache (Step S203). That marks the end of the operations. On the other hand, if it is determined that the connection terminal 20 has the access authority, then the reading-writing unit 13b authorizes a reading request or a writing request issued by the connection terminal 20 to be carried out (Step S204). That marks the end of the operations.

Meanwhile, if it is determined that the received request signal is sent by the remote terminal 30, then the control unit 13 determines whether or not the received request is a connection request (Step S205). If it is determined that the received request is a connection request (Yes at Step S205), then the authority managing unit 13c alters the access authority to the remote terminal 30 (Step S206). Subsequently, the delete command issuing unit 13a sends a delete command signal to the connection terminal 20 as an instruction to delete the data cache (Step S207). That marks the end of the operations.

On the other hand, if it is determined that the received request is not a connection request (No at Step S205), then the control unit 13 determines whether or not the received request is a connection termination request (Step S208). If it is determined that the received request is a connection termination request (Yes at Step S208), then the authority managing unit 13c alters the access authority to the connection terminal 20 (Step S209). That marks the end of the operations. In contrast, if it is determined that the received request is not a connection termination request (No at Step S208), then the operations are ended without the control unit 13 performing any operations.

In the memory card 10 according to the embodiment described above, when the remote terminal 30 issues a write request, a delete signal is sent as an instruction to delete the data cache from the buffer cache 23 of the connection terminal 20. Hence, it becomes possible to prevent a situation in which the data cache in the buffer cache 23 is inconsistent with the data stored in the memory 14.

Moreover, when the remote terminal 30 issues a connection request for the purpose of data writing, the access authority can be altered. While the remote terminal 30 has the access authority, if the connection terminal 20 issues a request, then a delete signal can be sent in response as an instruction to delete the data cache. Therefore, even if the configuration is such that the data cache in the connection terminal 20 cannot be deleted directly from the memory card 10, it still becomes possible to delete the data cache and to prevent the occurrence of inconsistency in files.

Moreover, in the embodiment described above, the data cache is deleted in response to a connection request signal sent for the purpose of data writing. However, the data cache can be deleted in response to any other signal related to data writing. For example, the data cache can be deleted in response to an activation instruction of a file transfer service, or in response to a file reception request, or in response to a file transfer completion notification.

Herein, the computer program executed in the memory card 10 according to the embodiment is recorded in the form of an installable or executable file on a computer-readable recording medium such as a compact disk read only memory (CD-ROM), a flexible disk (FD), a compact disk recordable (CD-R), or a digital versatile disk (DVD) that is provided as a computer program product.

Alternatively, the computer program executed in the memory card 10 according to the embodiment can be saved on a computer connected to the Internet in a downloadable manner. Still alternatively, the computer program executed in the memory card 10 according to the embodiment can be distributed over a network such as the Internet.

Still alternatively, the computer program executed in the memory card 10 according to the embodiment can be stored in advance, for example, in a read only memory (ROM).

The computer program executed in the memory card 10 according to the embodiment contains modules for each of the abovementioned constituent elements. In practice, for example, the CPU 11 (processor) reads the program from the recording medium mentioned above and runs it so that the program is loaded in main memory device. As a result, the module for each constituent element is generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication management apparatus that mediates data between (i) an information processing terminal having a temporary memory, (ii) an external memory device provided outside of the information processing terminal, and (iii) a device external to both the information processing terminal and the external memory device, the communication management apparatus comprising:
    a receiving unit configured to receive a write request issued by the device external to both the information processing terminal and the external memory device, the write request requesting to start writing data in the external memory device;
    a reading-writing unit configured to control reading of the data from the external memory device and control writing of the data in the external memory device; and
    a delete command issuing unit configured to, when the receiving unit receives the write request with respect to the external memory device from the device external to both the information processing terminal and the external memory device, issue a delete command to the information processing terminal for deleting temporary data that corresponds to the data stored in the external memory device and that is stored in the temporary memory.

2. The apparatus according to claim 1, wherein, while a signal of the write request is being received, if the information processing terminal issues a request signal, the delete command issuing unit issues the delete command as a response to the request signal.

3. The apparatus according to claim 1, further comprising:
    a terminal interface that is connectable to the information processing terminal; and
    an authority managing unit configured to, when the write request is received, alter access authority information, which indicates whether to authorize a connection request issued with respect to the external memory device by the terminal interface or to authorize a connection request issued with respect to the external memory device by the receiving unit, to the access authority information indicating that the connection request issued by the receiving unit is to be authorized,
    wherein while the access authority information is indicating that the connection request issued by the receiving unit is to be authorized, if the information processing terminal issues the connection request, the delete command issuing unit issues the delete command as a response to the connection request issued by the information processing terminal.

4. A communication management method for mediating data between (i) an information processing terminal having a temporary memory, (ii) an external memory device provided outside of the information processing terminal, and (iii) a device external to both the information processing terminal and the external memory device, the communication management method comprising:
    receiving a write request issued by the device external to both the information processing terminal and the external memory device, the write request requesting to start writing data in the external memory device;
    performing reading-writing that includes controlling reading of the data from the external memory device and controlling writing of the data in the external memory device; and
    issuing, when the write request with respect to the external memory device is received from the device external to both the information processing terminal and the external memory device, a delete command to the information processing terminal for deleting temporary data that corresponds to the data stored in the external memory device and that is stored in the temporary memory.

5. A computer program product comprising a non-transitory computer-readable medium having stored thereon a communication management program for mediating data between (i) an information processing terminal having a temporary memory, (ii) an external memory device provided outside of the information processing terminal, and (iii) a device external to both the information processing terminal and the external memory device, the program being executable by a computer to control the computer to execute functions comprising:

> receiving a write request issued by the device external to both the information processing terminal and the external memory device, the write request requesting to start writing data in the external memory device;
>
> performing reading-writing that includes controlling reading of the data from the external memory device and controlling writing of the data in the external memory device; and
>
> issuing, when the write request with respect to the external memory device is received from the device external to both the information processing terminal and the external memory device, a delete command to the information processing terminal for deleting temporary data that corresponds to the data stored in the external memory device and that is stored in the temporary memory.

* * * * *